United States Patent [19]
Schwartz

[11] 4,057,941
[45] Nov. 15, 1977

[54] MODULAR GREEN HOUSE CONSTRUCTION

[75] Inventor: Seymour L. Schwartz, North Hollywood, Calif.

[73] Assignee: Airflow Aluminum Awning Company, Gardena, Calif.

[21] Appl. No.: 642,418

[22] Filed: Dec. 19, 1975

[51] Int. Cl.² ............... E04B 1/12; E04B 7/02
[52] U.S. Cl. ........................... 52/63; 52/90; 52/92; 52/222; 52/302; 52/732
[58] Field of Search ............ 52/730, 731, 732, 222, 52/63, 57, 90, 92, 72; 47/17

[56] References Cited
U.S. PATENT DOCUMENTS

| | | | |
|---|---|---|---|
| 731,138 | 6/1903 | Stearns | 52/72 |
| 1,155,969 | 10/1915 | Taylor | 52/92 X |
| 2,642,018 | 6/1953 | Weeber | 52/72 X |
| 2,685,851 | 8/1954 | Zachman | 52/72 X |
| 2,837,153 | 6/1958 | Brown et al. | 52/63 |
| 2,963,131 | 12/1960 | Brockway | 52/732 |
| 2,986,150 | 5/1961 | Torian | 47/17 X |
| 3,080,875 | 3/1963 | Bartlett | 47/17 X |
| 3,143,165 | 8/1964 | Lewis et al. | 52/731 X |
| 3,150,463 | 9/1964 | Nearing et al. | 52/92 |
| 3,216,170 | 11/1965 | Deadrick | 52/731 |
| 3,222,841 | 12/1965 | Lipof | 52/731 |
| 3,333,373 | 8/1967 | Taylor et al. | 52/90 X |
| 3,382,639 | 5/1968 | Smith et al. | 52/731 |
| 3,559,357 | 2/1971 | Lowe | 52/730 X |
| 3,791,076 | 2/1974 | Gahler | 52/2 |
| 3,798,853 | 3/1974 | Castle | 52/92 |
| 3,940,893 | 3/1976 | Rausch et al. | 52/90 |

FOREIGN PATENT DOCUMENTS 290,361  3/1967  Australia .................. 52/731

Primary Examiner—Leslie Braun
Attorney, Agent, or Firm—Jessup & Beecher

[57] ABSTRACT

A modular greenhouse construction in which panels are prefabricated from a universal beam or mullion and the panels are interlocked to form walls and a roof. The universal beam has a spline receiving groove in one surface and a ribbed channel in the surface opposite with C-shaped slots on either side of the beam for interlocking the two panels. Joints are formed by L-shaped inserts engaging an interior channel in the beam with the particular angle of the joint being determined by the shape of the insert. For 90° corner joints, the insert would, of course, be a 90° L-shape. An enclosure is formed by securing adjacent panels with an H-shaped insert engaging abutting C-shaped slots on the periphery of each panel. Caps which snap on the frames are provided to form corners for the building and a gabled roof.

9 Claims, 8 Drawing Figures

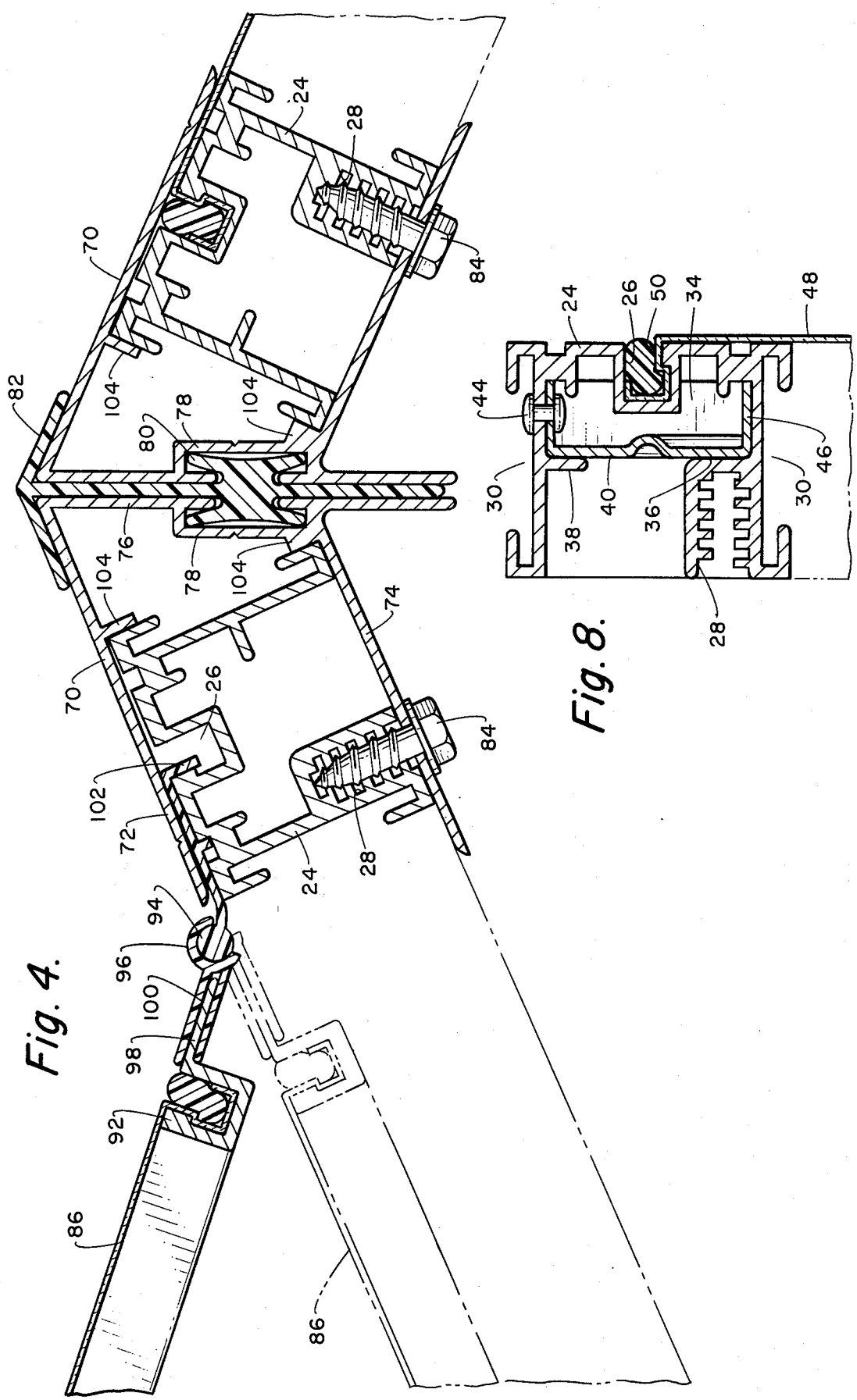

MODULAR GREEN HOUSE CONSTRUCTION

BACKGROUND OF THE INVENTION

This invention relates generally to prefabricated structures and more particularly relates to a universal beam construction to prefabricate panels for assembling a structure.

Prefabricated structures are known in the art and generally are formed of solid panels which are joined in many different ways. Some provide solid panels with adjacent interlocking edges, while others permit prefabrication by utilizing a multitude of unusually shaped members and beams. They very often require special tools for assembling as well as drilling holes for fastening.

SUMMARY OF THE INVENTION

The purpose of the present invention is to provide a modular building construction which eliminates the need for special tools and can be quickly and easily assembled.

The present invention provides a modular construction greenhouse by using a universal beam structure for prefabricating panels. The universal beam or mullion has a spline receiving channel for attaching a screening or transparent material to the frame and a ribbed channel on the opposite surface to permit joining of other members without any pre-drilling. Opposite sides of the beam have C-shaped slots which, when abutted, permit panels to be connected to form walls and ceilings by inserting an H-shaped insert. Capping members slide over the outside edges of the frames to permit formation of corners and a slanted or gabled roof.

It is one object of the present invention to provide a universal beam construction which permits the prefabrication of panels for use in a structure.

Another object of the present invention is to provide a universal beam construction which permits prefabrication of panels with a minimum of tools.

Another object of the present invention is to provide a universal beam construction with a channel which eliminates the need for drilling and threading holes.

Yet another object of the present invention is to provide a universal beam member which permits prefabricated panels to be interlocked to produce an enclosure.

Other objects, advantages and novel features of the invention will become apparent from the following detailed description of the invention when considered in conjunction with the accompanying drawings, wherein like reference numbers identify like parts throughout.

BRIEF DESCRIPTION OF THE DRAWINGS

FIG. 4 is a sectional view taken at 4—4 of FIG. 1 illustrating the manner of forming a peak for the roof portion of the structure.

FIG. 8 is a sectional view taken at 8—8 of FIG. 7 illustrating the insulation of the inserts to form joints to produce prefabricated panels.

DETAILED DESCRIPTION OF THE PREFERRED EMBODIMENT

Figure 1:
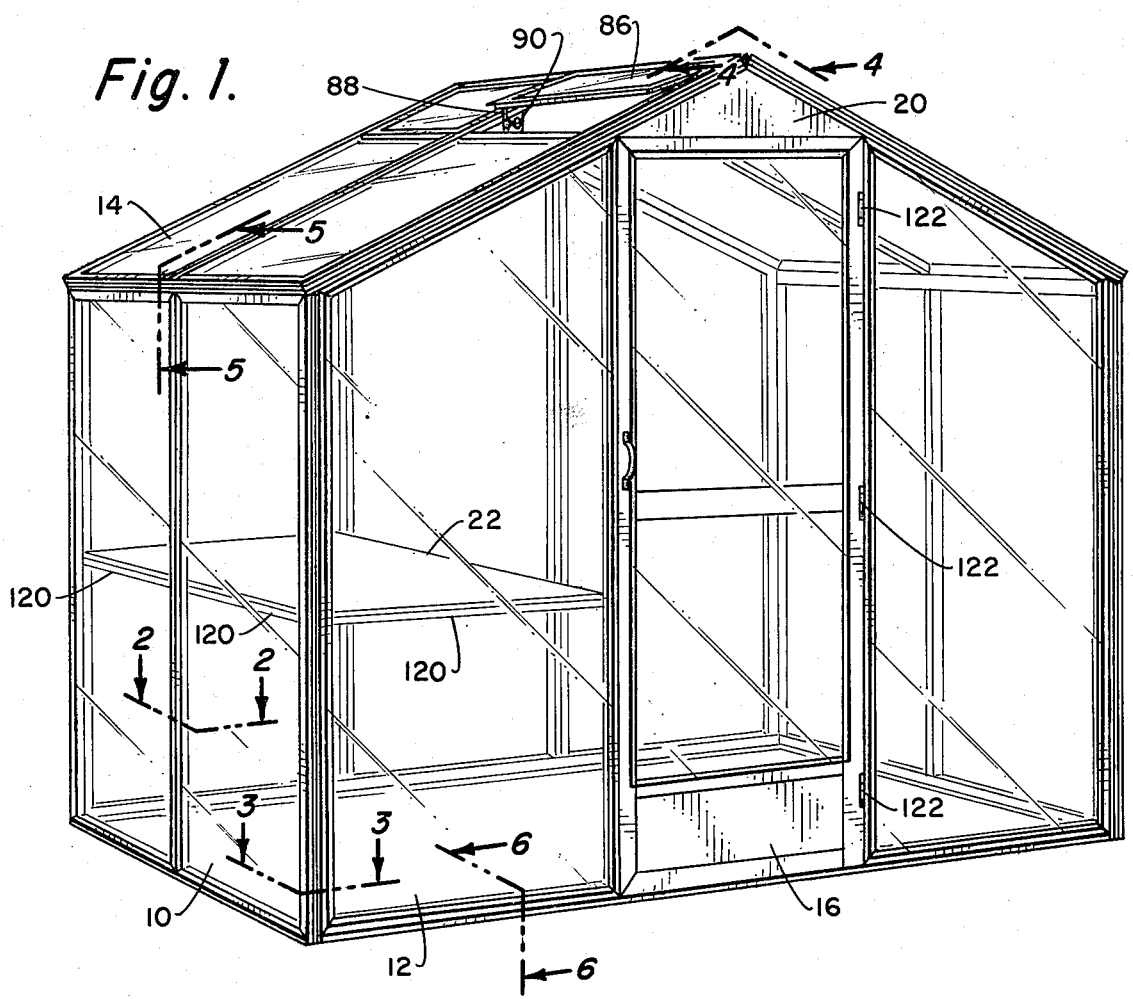
FIG. 1 is a perspective view of a prefabricated modular enclosure.

An enclosure is shown in FIG. 1 which is suitable for use as a greenhouse and is comprised of prefabricated panels 10, 12 and 14, forming walls and a slanted roof with a door 16 being attached to the front for entry. A triangular filler 20 is provided above the door and is attached to the roof panels 14 in any suitable manner. The various prefabricated panels 10, 12 and 14 are constructed from a universal beam or mullion which has a ribbed channel providing for screw attachments around the entire periphery of each panel. This permits shelves as is shown in 22 to be installed at any number of positions desired.

The universal beam or mullion is shown in cross-section in FIGS. 2, 3, 4, 5, 6 and 8. Each of these sectional views taken from FIG. 1 shows various methods of joining the prefabricated panels to form the walls and roof of the enclosure. Referring now to FIG. 8, which shows most clearly the universal mullion 24 for constructing the prefabricated panels before creating the enclosure. The mullion 24 is an extruded beam having a spline receiving slot in the external face 26 and a ribbed channel 28 in the opposite surface. Opposite sides of the mullion 24 are formed with C-shaped slots 30 and 32 for interlocking adjacent panels which will be discussed more fully hereinafter. The mullion 24 has a substantially U-shaped form and has an interior channel 34 formed by the shoulder 36 of the ribbed channel 38 and a flange 38 extending outward from the opposite side of the mullion 24. The channel 34 is for the purpose of forming joints with the mullion 24 to create the prefabricated panels as shown in FIG. 7.

Figure 7:
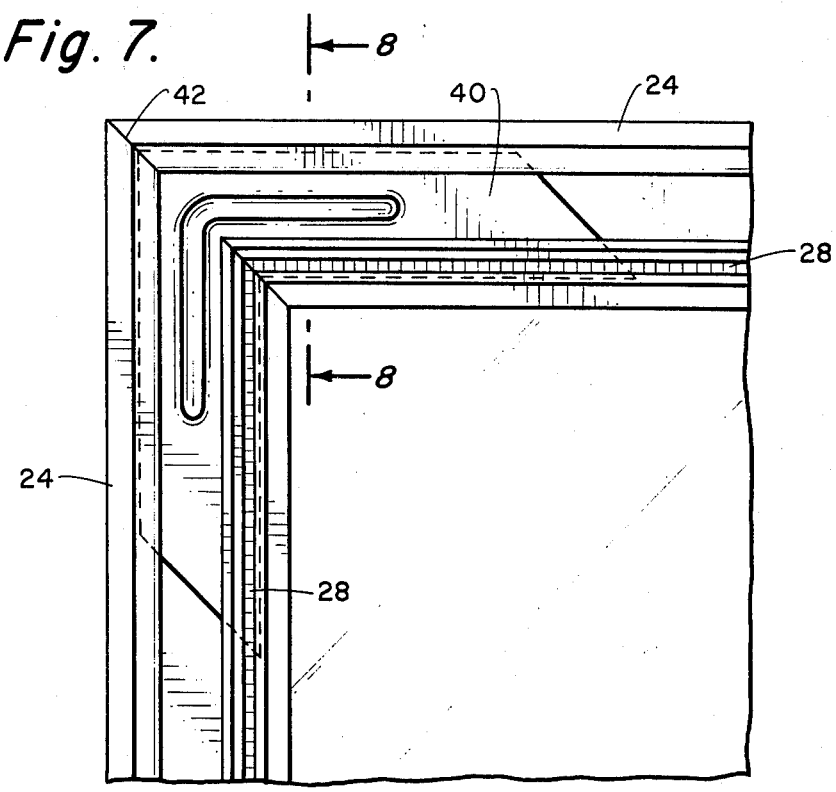
FIG. 7 is a view of a corner of one panel illustrating the manner in which joints were formed.

FIG. 7 illustrates the manner of forming a 90° joint to create panels such as are shown at 10 in FIG. 1. But, of course, it should be realized that the joint can be formed with any angle depending upon the particular cap used and the type of insert 40 used for joining the adjacent mullions 24. The insert 40 shown in FIG. 7 is a 90° insert, but, of course, inserts having greater or less than 90° would be needed to form the prefabricated panels 12 for the front and back of the structure shown in FIG. 1. The insert 40 engages the channel 34 of mullions 24 which have been precut to form the desired angle. The angle 42 of each mullion 24 is cut in FIG. 7 to 45°, which, when joined, will form a 90° joint.

With the proper insert 40 the mullions can be cut and prefabricated to form square, rectangular, or irregular panels, such as are shown at 12. For the rectangular panel of FIG. 1, the mullions 24 would be precut with the corners joined by the inserts 40 to form a frame. The inserts 40 may be fastened with rivets 44, as shown in FIG. 8, if desired. However, the rivets 44 may be unnecessary if the flanges 46 of the inserts 40 are made large enough to create a force or strong friction fit. Plastic sheet 48, or screening material if making a different type of enclosure, is stretched across the frame and secured by spline 50 forced into the spline receiving groove 26 on the mullion 24. Thus panels of any size and shape can be formed from the universal mullion 24 with the covering being of some flexible material such as plastic or screening.

Figure 2:
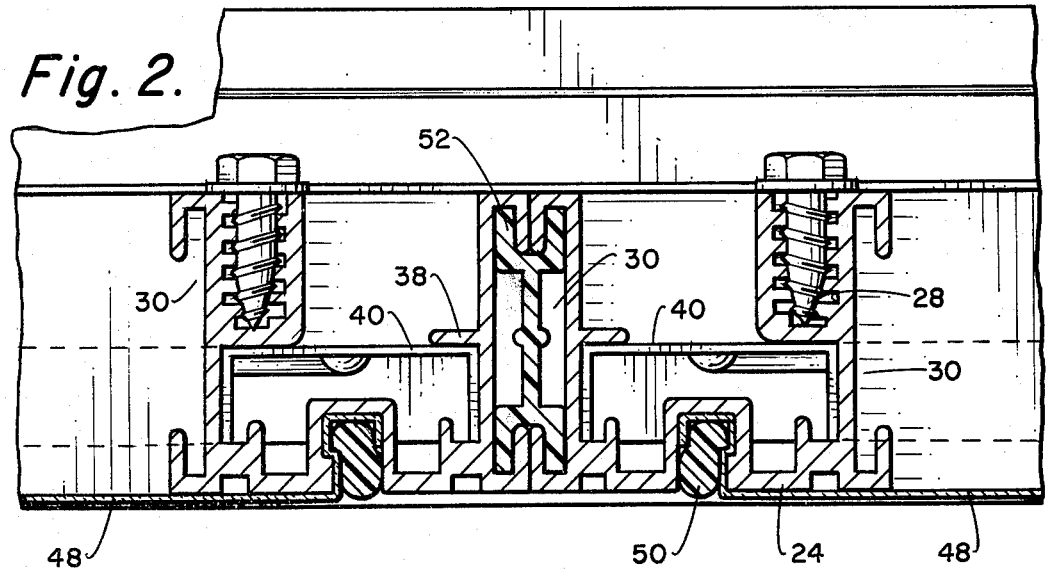
FIG. 2 is a sectional view taken at 2—2 of FIG. 1 illustrating the joining of adjacent prefabricated panels.

Walls are formed by joining adjacent panels as shown in FIG. 2. The C-shaped slots 30 on the outside periphery surface of each prefabricated panel are abutted and an insert 52, preferably of a plastic or PVC material, is forced into the adjacent C-shaped slots 30, thus joining adjacent panels to form the wall.

Figure 3:
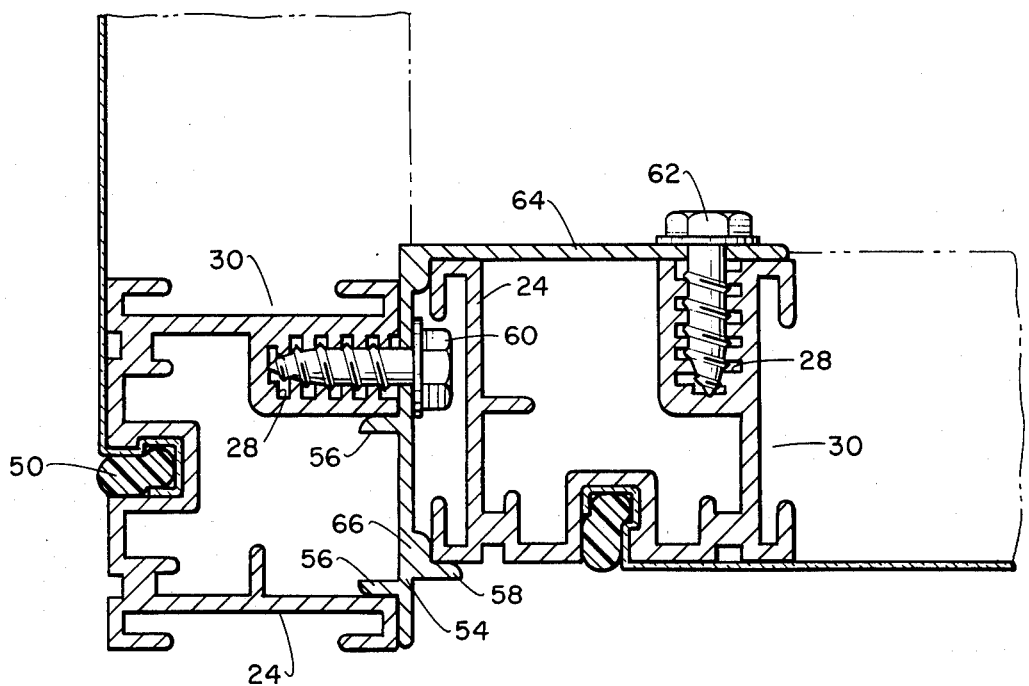
FIG. 3 is a sectional view taken at 3—3 of FIG. 1 illustrating the method of forming a corner of the enclosure by joining prefabricated panels.

Walls are joined to form corners, as shown in FIG. 3. For this purpose a corner bracket 54 is provided. The corner bracket is L-shaped and has flanges 56 for engaging the open side of mullion 24 to position the bracket and a lip 58 to engage the outside edge of the other mullion 24 for forming the corner. Screws 60 through the bracket 54 engaging the ribbed channel 28 secure the bracket to the first mullion 24 and screws 62 through the opposite flange 64 of the corner bracket 54 secure the other wall to the bracket. Platforms 66 in the interior corners of bracket 54 provide clearance for the head of screws 60. The number of screws 60 and 62 fastening the bracket to the mullions 24 to form the corner is determined by the amount of strength that is desired. There may be any number with any suitable spacing since the channel 28 is around the entire periphery of the frame as shown in FIG. 7. This eliminates the need to locate any tapped holes, but merely find the channel and force a sheet metal screw 60 or 62 into engagement with the channel 28.

The peak of the roof is formed as is shown by FIG. 4, which is a sectional view taken at 4—4 of FIG. 1. Here roof cap brackets 70 slideably engage the mullions 24 forming the frame of each prefabricated panel. The roof cap brackets 70 have an exterior web 72 and an interior web 74. The joining web 76 of the roof cap 70 is made at a predetermined angle so that the roof cap brackets, when placed in opposite directions on prefabricated panels, will form a peak as shown in FIG. 1. The adjoining web 76 also has C-shaped slots 78 for engagement by an interlocking insert 80, which has a roof flap 82 for sealing the peak. The roof cap brackets are secured to the frames again by screws 84 engaging the ribbed channel 28 of the mullions 24.

Air vents 86 are provided for the building as shown in FIG. 1 and are secured open by a rod 88 attached to the vent 86 and a thumb screw 90 for fixing the rod in any particular position, thus maintaining the vent 86 in a predetermined open position. Attachment of the vent 86 is also illustrated in the sectional view of FIG. 4. The vent 86 is comprised of a window frame 92 which is secured to an edge comprised of a ball 94 and a socket 96. The flange 98 of the window frame 92 engages a narrow slit 100 formed in the socket member 96. The ball member 94 has a flange which has a lip 102 engaging the spline receiving channel 26 in the frame of a panel. The ball and socket 94, 96, respectively, are preferably constructed of a plastic or PVC material. The vent 86 is shown in the closed position by phantom lines. The lip 102 is locked in the spline groove 26 by the flange 72 of the roof cap bracket 70.

Ledges 104 provide a seat in the roof cap brackets 70 for the mullion 24 of the prefabricated panels. These ledges 104 provide for proper alignment of the parts so that placement of the screws 84 is simplified.

Figure 5:
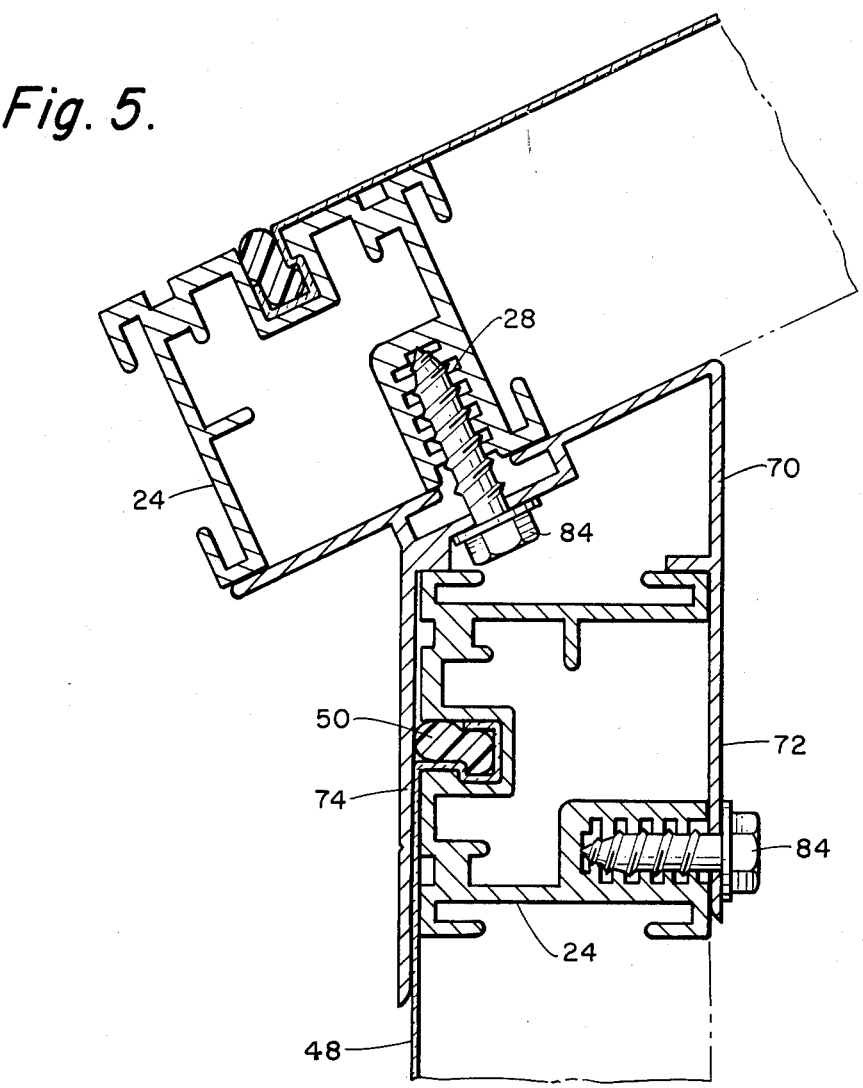
FIG. 5 is a sectional view taken at 5—5 of FIG. 1 illustrating the manner of joining the roof panels to the top edges of wall panels.
Figure 6:
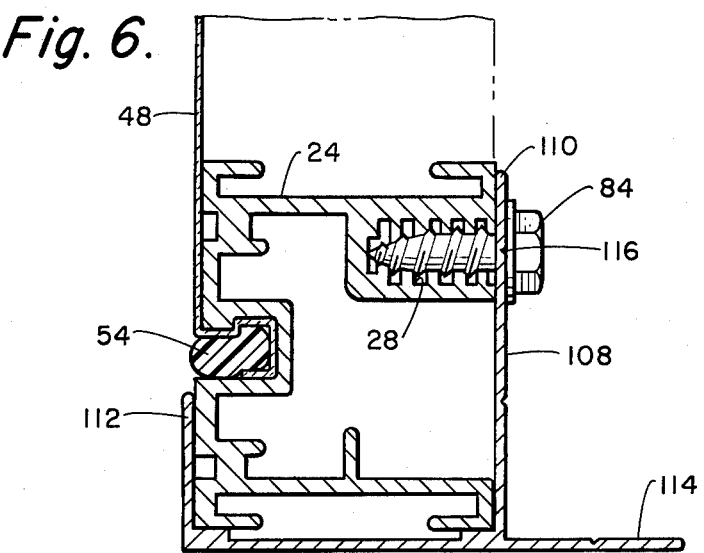
FIG. 6 is a sectional view taken at 6—6 of FIG. 1 illustrating the method of capping the bottom edge of the structure.

In order to form the angled roof, the panel is joined to the top of the side wall panels 10, as is shown in FIG. 5. For this purpose the roof cap bracket 70 may also be used. The roof cap bracket 70 fits over the mullion 24 as before. However, before installation the roof cap bracket 70 is fastened by a screw 84 engaging the channel 28 of the roof panel mullion 24. The screw 84 passes through the wall of the C-shaped channel 78 of the roof bracket cap 70. It should be noted that now the web 72 is on the interior side and the roof cap bracket 70 is secured to the panel again by screws 84. With the roof cap bracket 70 reversed in this manner, the web 74 is now on the exterior surface of the mullion 24. The web 74 serves the additional purpose of retaining the spline 50, preventing the plastic 48 from being dislodged from the panel.

The bottom edge of the structure is capped with a bottom bracket 108 having flanges 110 and 112. The bottom bracket 108 has inward extending flange 114 for securing the structure to the ground, if desired. Each flange of the bottom bracket 108, top cap 70, and corner bracket 54 which when installed extends over the ribbed channel 28 in the mullion 24 has a V-groove 116 which provides an indication as to where the ribbed channel is located behind the flange. This slight notch 116 provides a starter for the screws 84 and in addition indicates the location of the ribbed channel 28, thus facilitating assembly.

The unique design of the mullion 24 permits many different shapes of panels to be constructed and arranged to form a structure. For example, if desired, the structure shown in FIG. 1 could have a flat roof with all the side wall panels being rectangular and the exact height of the door 16. Also any suitable flexible material could be attached to the panels, such as an opaque plastic or a screening material. The ribbed channel 28 permits attachment of shelves or anything to the frames at any position in the interior of the structure, such as a shelf 22, as shown in FIG. 1, resting on beams 120 which are secured by screws 84 engaging the ribbed channel 28 in the mullions 24. Also since the channel 28 traverses the entire periphery on each panel, the shelf 22 or additional shelves as needed can be placed at any desired position within the enclosure. A door 16 is fastened by hinges 122 in the normal manner.

The unique shape of the mullion 24 provides an extremely wide range of panels which can be easily constructed and interlocked in a variety of ways. With the structure shown there are very few tools needed other than those for mounting screws 84 and for cutting the angles 42 (FIG. 7) to prefabricate the panels. In addition, a spline inserting tool would be required to force the spline into the slots 26 for fastening the plastic or screening material. It also should be noted that the spline receiving slot can be provided with a slight offset in order to create a positive locking action on the spline 50.

Obviously many modifications and variations of the present invention are possible in the light of the above teachings. It is therefore to be understood that the full scope of the invention is not to be limited to the details disclosed herein and may be practiced otherwise than as specifically described.

What is claimed is:

1. A modular building construction comprising:
a plurality of panels having a frame formed of a universal beam comprised of:
an elongate substantially hollow beam having a substantially rectangular cross section;
a pair of outwardly facing, mirror image, continuous slots on opposite sides of said beam for interlocking adjacent beams when their sides are in abutment;

an outward facing, ribbed channels on a third side of said beam for forming a continuous, peripheral, screw-receiving channel when a plurality of said beams are formed into panel frames;

cover securing means on a fourth side of said beam for securing a panel covering, interlocking means for interlocking the mirror image slots of abutting universal beams to form walls and a ceiling;

capping bracket means for sliding over and capping said frames for joining adjacent walls to form corners;

said capping bracket having a flange extending over the rib channel for securing adjacent panels; and a substantially transparent material stretched across and secured to said cover securing means for enclosing said modular building.

2. The modular building construction according to claim 1 wherein:

said securing means comprises;

a spline receiving channel along one side of said beam whereby said channel is formed around the periphery of said frame.

3. The modular building according to claim 1 including vent means for controlling air circulation in said building.

4. The modular building according to claim 1 wherein said building has a gabled roof formed from:

oppositely angled top cap brackets engaging roof panel frames;

said caps having abutting slots for interlocking; and interlocking means engaging the abutting slots.

5. The modular building according to claim 4 wherein said interlocking means includes means for sealing the seam between said oppositely angled abutting roof caps.

6. The modular building according to claim 4 wherein one side of said caps extends over the ribbed channel in said beams whereby the caps may be secured with screws.

7. The modular building construction according to claim 3 wherein said vents comprise:

hinged panels hingedly attached to roof panels.

8. The modular building construction according to claim 7 wherein said roof panels form a gabled roof;

said gabled roof being formed by top cap brackets engaging the frame of the roof panels to form a peak.

9. The modular building construction according to claim 8 wherein said top caps have flanges extending over the edge of said panels; and said flanges securing said hinges for the vent panels to said top panels.

* * * * *